United States Patent [19]

Langston

[11] Patent Number: 4,846,753
[45] Date of Patent: Jul. 11, 1989

[54] TURKEY CALL WITH SOUND CHAMBER

[76] Inventor: Randy P. Langston, 1936 Wee Kirk Rd., SE., Atlanta, Ga. 30316

[21] Appl. No.: 159,245

[22] Filed: Feb. 23, 1988

[51] Int. Cl.[4] .................. A63H 5/00; G10D 13/08; G10D 13/02; A01M 0/0
[52] U.S. Cl. .................................. 446/397; 84/410; 84/420; 43/1
[58] Field of Search ............... 446/397, 398, 402, 404, 446/418, 422; 84/410, 402, 420, 83, 84, DIG. 21; 43/1, 2

[56] References Cited

U.S. PATENT DOCUMENTS

| | | | |
|---|---|---|---|
| 574,534 | 1/1897 | Gibson | 446/397 |
| 2,606,401 | 8/1952 | Boatright | 446/397 |
| 2,643,483 | 6/1953 | Walker | 446/397 |
| 3,908,505 | 9/1975 | Ono | 84/83 |
| 4,003,159 | 1/1977 | Piper | 446/397 |
| 4,586,912 | 5/1986 | Adams | 446/418 X |
| 4,606,733 | 8/1986 | Willis | 446/397 |
| 4,752,051 | 6/1988 | Chang | 446/397 X |
| 4,758,197 | 7/1988 | Lee | 446/418 X |

Primary Examiner—Mickey Yu
Assistant Examiner—D. Neal Muir
Attorney, Agent, or Firm—Harry I. Leon

[57] ABSTRACT

A box type turkey call having an upwardly open sound box of a generally rectangular shape which overlies and is rigidly coupled to a closed sound box with which the open sound box shares a common wall. The common wall which extends laterally from the lower edges of the sidewalls of the open sound box forms a cover for the closed sound box. An elongated, wooden actuator top having a transversely convex undersurface is mounted, at one end, on the underlying open sound box and it can be scraped across the top edges of the sidewalls of the open box to produce a sound. The sound so produced is transmitted to the closed sound box where it is modified in tonal quality and amplified. Sounds which alternately closely simulate the hen turkey mating call and the gobble of a mature tom turkey can be generated with this turkey call.

4 Claims, 7 Drawing Sheets

TURKEY CALL WITH SOUND CHAMBER

BACKGROUND OF THE INVENTION

The present invention relates to box type game calls which are utilized by hunters and others to attract wild turkeys and other birds toward the user.

Open boxes in which the tops of a pair of elongated side walls are scraped by a loosely hinged cover to make bird-like sounds have been used for many years. One of the first U.S. patents for such a device was issued Jan. 5, 1897, to Gibson (U.S. Pat. No. 574,534). Gibson recognized that the combination of an upwardly open box with elongated wooden sidewalls and a cover with a transversely curved bottom surface which is loosely hung at one end of the box can be employed to make a turkey-like sound by scraping the cover across the top edges of the sidewalls. The sound produced by Gibson's device lacked the quality to fool many tom turkeys, however, Fleener (U.S. Pat. No. 2,511,403) modified Gibson's invention by tapering the sidewalls longitudinally and tilting them inward slightly. Unfortunately, this modification yielded a noise that is similar to the call produced vocally by a goose and was of little use to turkey hunters.

Subsequent attempts to achieve realistic sounds in game calls were made by Lee in U.S. Pat. No. 4,343,108 and by Moss in U.S. Pat. No. 4,422,262. Lee offered a combination having an upwardly open, elongated wooden box and an actuator top attached thereto in which the box is divided longitudinally into two laterally opposed sound chambers by a common sidewall or sound board. The presence of a third sidewall in Lee's call allows one to vary the sounds which can be generated with it by repositioning a screw about which the actuator top is pivoted; the pivot determines which of the three sidewalls is struck as the actuator top is being moved across the open box.

Moss' device is similar to Lee's, but the common sidewall has a greater span vertically than the two outer sidewalls and is tilted relative to them. When the third sidewall is set in motion by the actuator top, a sound of a different pitch is made when the remaining two sidewalls are struck.

Nevertheless, each of the game calls in the cited prior art is only capable of making sounds which are analogous to those made by the vocal chords. The inventors of these calls failed to realize that distinctive voice sounds are made not only by the vocal chords but also are the products of resonance chambers such as are typically found within the nose and throat of vocal creatures. Specifically, the improvements made by Lee and by Moss in adding a third sidewall or sound board were comparable to increasing the number of vocal chords. The need to give a game call a more realistic sound by providing a resonance chamber which is distinct from the sound box containing the sound boards was not recognized, and hence resonance for a wide range of tones which is required to approximate closely the actual sounds made by a turkey was not possible. As a consequence, the turkey calls in the prior art, although workable, failed to bring in many of the birds that would have been attracted if the sound had been closer to that made by the game itself.

SUMMARY OF THE INVENTION

It is the object of this invention to provide an improved game call that closely simulates the sounds made by wild game.

In accordance with this invention, there is provided a game call having both a generally rectangular, elongated upwardly open sound chamber assembly and an elongated, generally closed sound chamber assembly which is rigidly coupled thereto. Sound is generated by scraping the undersurface of an actuator top across the upper edges of at least two laterally spaced, elongated wooden sidewalls disposed within the open sound chamber assembly. A single wall forms the bottom surface of the open sound chamber and the top cover of the closed sound chamber so that vibrations transmitted to this wall from the sidewalls can readily set an air column within the closed sound chamber in motion, thereby producing resonances which enhance the tonal quality of the sounds made by scraping the actuator top across the sidewalls. In this respect, the sidewalls of the open sound chamber assembly act when set into motion by the actuator top similarly to the strings of a violin when a bow is drawn across them; and the closed sound chamber assembly acts like the body of the violin, giving richness to the sound.

The heart of the invention lies not only in the addition of the generally closed sound chamber assembly but also in an efficient coupling between it and the pen sound chamber assembly. Lateral extensions of the wall shared by both the open and closed sound chamber assemblies are much thinner than those used in the bottom walls of sound boxes in the prior art. The use of these thin lateral extensions enhances the degree of coupling between the shared wall and the sidewalls so that when the latter are set in motion, sympathetic vibrations of significant amplitude are induced in the shared wall, resulting in resonance for a wide range of tones.

BRIEF DESCRIPTION OF THE DRAWINGS

Further details are explained below with the help of the examples illustrated in the attached drawings in which.

DESCRIPTION OF THE PREFERRED EMBODIMENTS

In the drawings, there is shown an apparatus in accordance with the present invention for calling game birds towards the user, cited generally by the numeral 10, which includes an upper chamber 11 with an actuator top 14 and an open sound box of generally rectangular shape comprising a pair of elongated, laterally spaced wooden sidewalls 12, 13, front and rear end pieces 17, 18, and a bottom wall 20. Both of the sidewalls 12, 13 are fixedly mounted to the end pieces 17, 18 and to the bottom wall 20 from which the sidewalls rise generally vertically. Further, the wall 20 extends laterally from the lower edges of the sidewalls 12, 13 to form a cover for a lower chamber 21 which is of greater width in a transverse direction than is the upper chamber 11.

The lower chamber 21, like the upper chamber 11, is of generally rectangular shape; but the chamber 21 is formed within a closed sound box. This closed sound box comprises, in addition to the bottom wall 20 of the open sound box, a pair of laterally spaced, elongated sidewalls 22, 23, end walls 24, 25, and a base wall 26. Both of the sidewalls 22, 23, are tapered, decreasing in wall thickness upwardly, and are fixedly mounted to the end walls 24, 25, to the base wall 26 and to the bottom wall 20. Further, at least one sound escape hole is provided so that any sound generated within the apparatus 10 and transmitted to the closed sound box can escape. The preferred embodiment includes a pair of narrow slots 19a, 19b formed in the lateral extensions of the wall 20 away from the open sound box.

Figure 1:
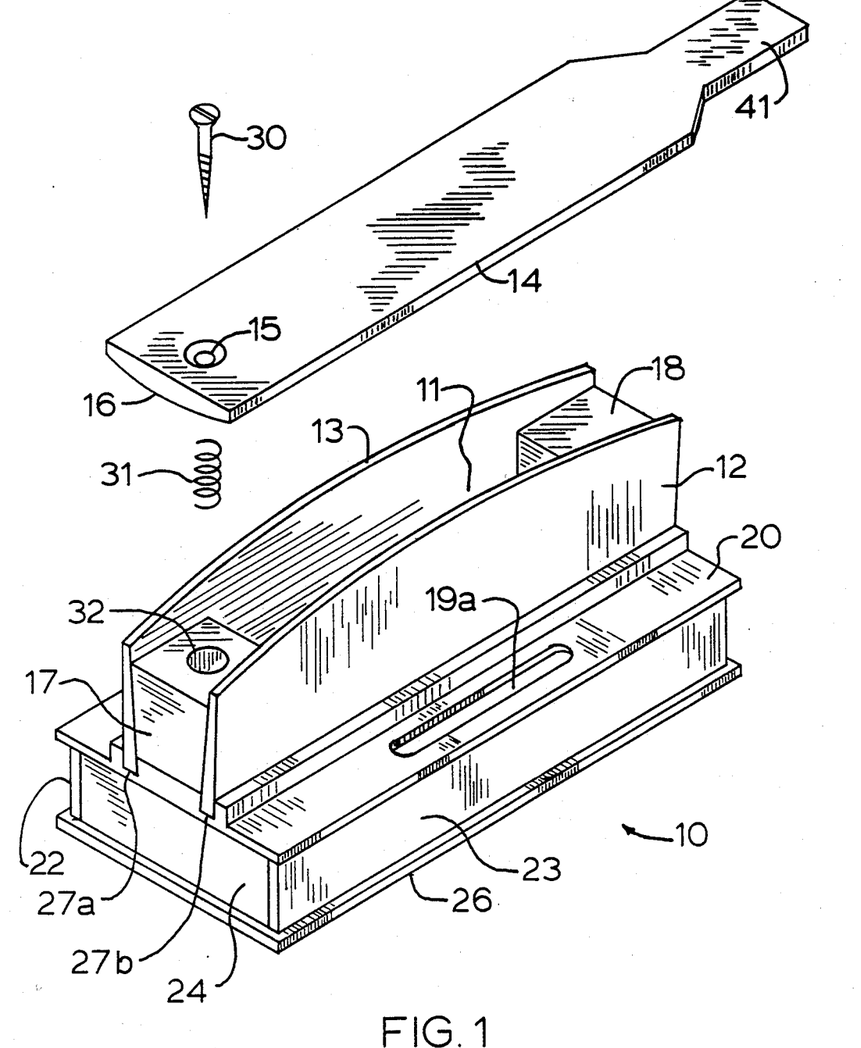
FIG. 1 is an exploded perspective view of the turkey call according to the present invention.
Figure 2:
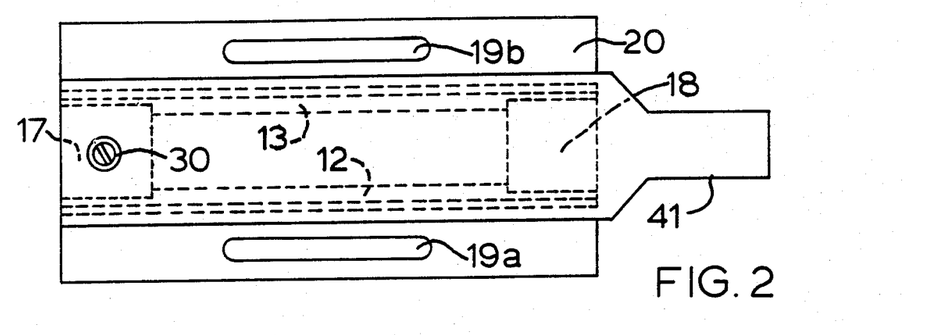
FIG. 2 is a top plan view of the turkey call according to FIG. 1.
Figure 3:
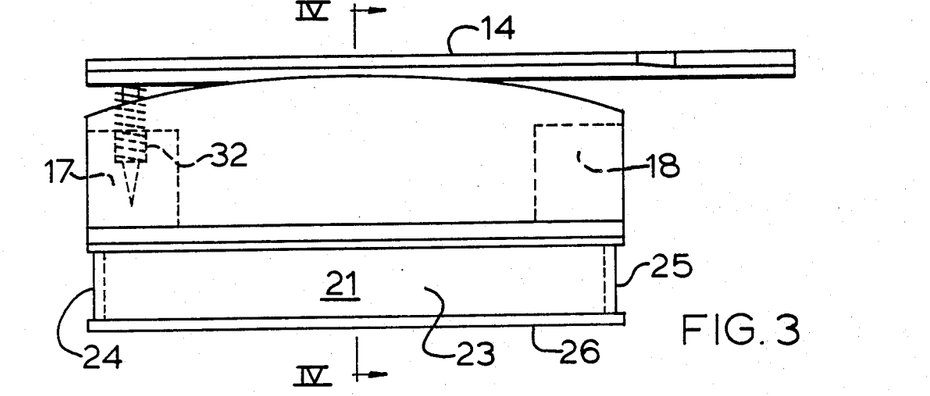
FIG. 3 is a side elevational view of the turkey call according to FIG. 1.
Figure 4:
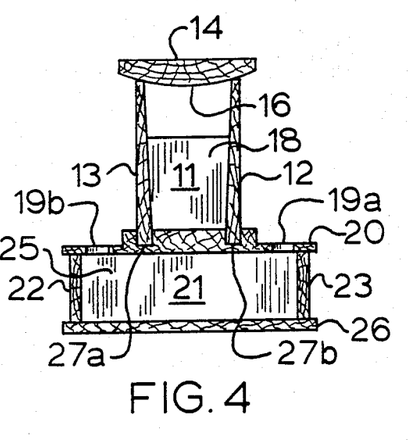
FIG. 4 is a cross-section IV—IV from FIG. 3.

As is best seen in FIG. 1, the actuator top 14 has a hole 15 formed in one end thereof which, together with a compression spring 31, receives a screw 30. The screw 30, which is secured in the end piece 17, provides an axle about which the actuator top 14 can be rotated. The spring 31 abuts a stepped face in a cavity 32 formed in the end piece 17 when the screw 30, the spring, the actuator top 14, and the end piece are assembled. Distal the hole 15, an extension of the actuator top 14 protrudes beyond the end piece 18 forming a reduced grip 41. A section 16 of the undersurface of the actuator top 14 which is adapted to engage the top edges of the sidewalls 12, 13 is slightly convex in a transverse direction as shown in FIG. 4.

Contact between the undersurface of the actuator top 14 and the top edges of the sidewalls 12, 13 is possible when the spring 31 is compressed sufficiently. By pressing the grip 41 downwardly and swinging the actuator top 14 slightly about its pivot, a user can easily scrape the section 16 against the top edge of either sidewall 12, 13 and thereby set it into vibration.

With the sidewalls 12 and 13 fixedly mounted to the bottom wall 20, any vibration of the sidewalls is transmitted to it; and sympathetic vibration of the air column within the lower chamber 21, which is also in contact with the wall 20, results in an amplification of any sounds produced when the sidewalls 12, 13 are set in motion. The effectiveness of the chamber 21 as a resonator is a function of how well the sound generated originally by scraping the sidewalls 12, 13 is actually transmitted into the chamber 21. In order to obtain efficient sound transmission within the apparatus 10, the lower edges of the sidewalls 12, 13 are preferably mounted within grooves 27a, 27b formed, by a datto process or the like, in the bottom wall 20 (FIG. 4). Further, the sections of the bottom wall 20 which extend laterally from shoulders contiguous the outsides of the lower edges of the sidewalls 12, 13 are less than one-half as thick as is the remainder of the wall 20. The thickness of these sections measures, by way of examples, only approximately 3/32 inch whereas the portion of the wall 20 disposed between the sidewalls 12, 13 is approximately ¼ inch thick. It will be appreciated that such thin sections are not practicable in the bottom wall of sound boxes having a single sound chamber. The use of these sections in the preferred embodiment gives rise to an unique coupling between the and the sidewalls 12, 13 which is highly efficient in inducing sympathetic vibrations in the wall 20.

The upper and lower sidewalls 12, 13; 22, 23, the bottom wall 20, the end pieces 17, 18, the end walls 24, 25 and the base wall 26 are preferably formed of spruce, maple or the like as is the actuator top 14 which, in the preferred embodiment, is fabricated from a solid piece of wood. In addition, the bottom wall 20 is preferably formed of a softer wood than are the sidewalls 12, 13 to enhance the capacity of the wall 20 to be set in motion by their vibrations.

Figure 5:
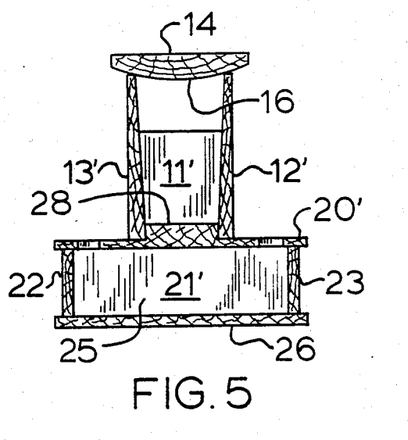
FIGS. 5-7 are a modification of FIG. 4 with different designs for attaching the upper sidewalls along their bottom edges to the remainder of the turkey call.

Alternately, the upper sound box may be made by hollowing out a solid wooden structure. As illustrated in FIG. 5, the elements of such a sound box which are modified from the preferred embodiment but which correspond to similar elements therein are denoted by primed numbers respectively. To enhance the extent to which sound is transmitted beteween the sidewalls 12', 13' and the lower chamber 21' in this alternate embodiment, the area of contact between the sidewalls 12', 13' and the bottom wall 20' is made as large as practicable with the use of a shoulder 28.

Figure 6:
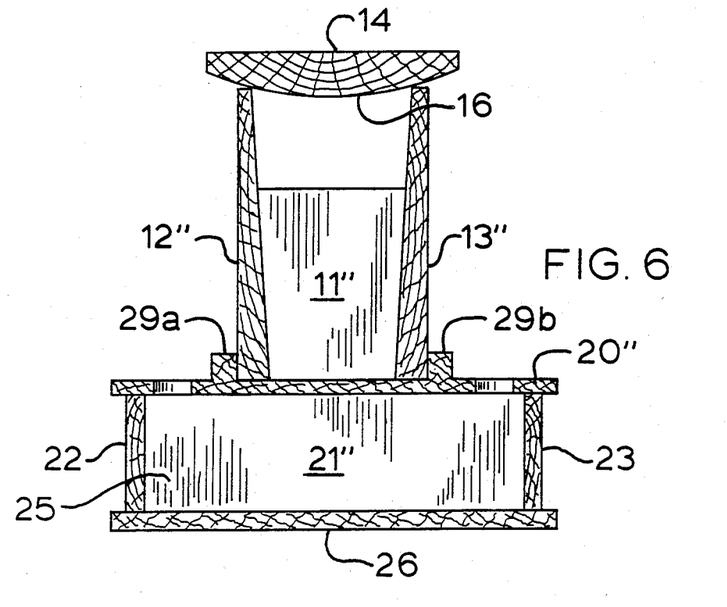

A second alternate embodiment is made by using reinforcing blocks 29a, 29b to attach the upper sidewalls to the bottom wall. As illustrated in FIG. 6, the elements of such a sound box which are modified from the preferred embodiment but which correspond to similar elements therein are denoted by doubly primed numbers respectively. These reinforcing blocks 29a, 29b serve to enhance the extent to which sound is transmitted beteween the sidewalls 12", 13" and the lower chamber 21" in this alternate embodiment.

Figure 7:
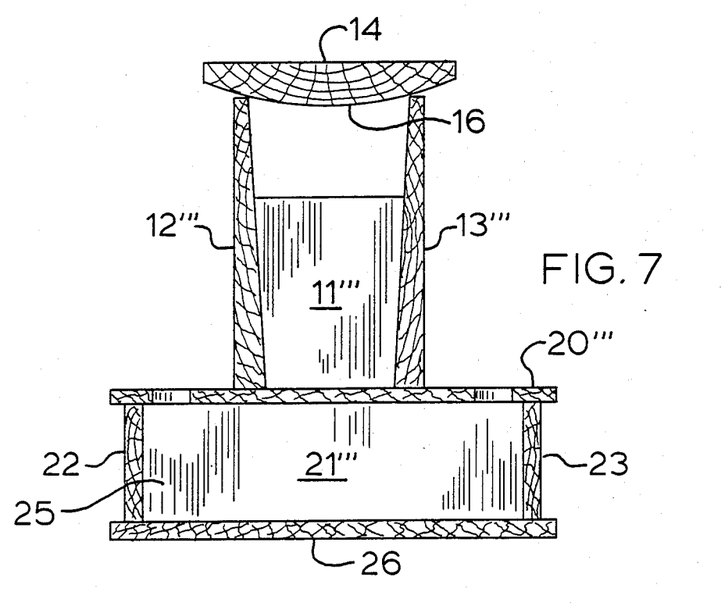

A third alternate embodiment is made without the use of any reinforcing blocks, shoulder or grooves in the attachment between upper sidewalls to the bottom wall. As illustrated in FIG. 7, the elements of such a sound box which are modified from the preferred embodiment but which correspond to similar elements therein are denoted by triply primed numbers respectively. The extent to which sound is transmitted between the sidewalls 12''', 13''' and the lower chamber 21''' is somewhat diminished over that which achieved with embodiments shown in FIGS. 1-6 because of the lack of reinforcement of the joints between the sidewalls and the wall 20'''.

TESTING OF THE TURKEY CALLERS

In order to evaluate the quality of the sound generated by the several embodiments of the turkey caller according to the present invention and to compare them with other turkey callers currently being marketed, testing was performed by the Acoustical Physics Laboratories of Doraville, Georgia, using a Techron System 12 FFT analyzer. FIGS. 8-15 show the results of this testing. In each graph in FIGS. 8-15, the horizontal axis covers a frequency range from 0-2000 Hz; and the vertical axis a 40 decibel range.

Figure 8:
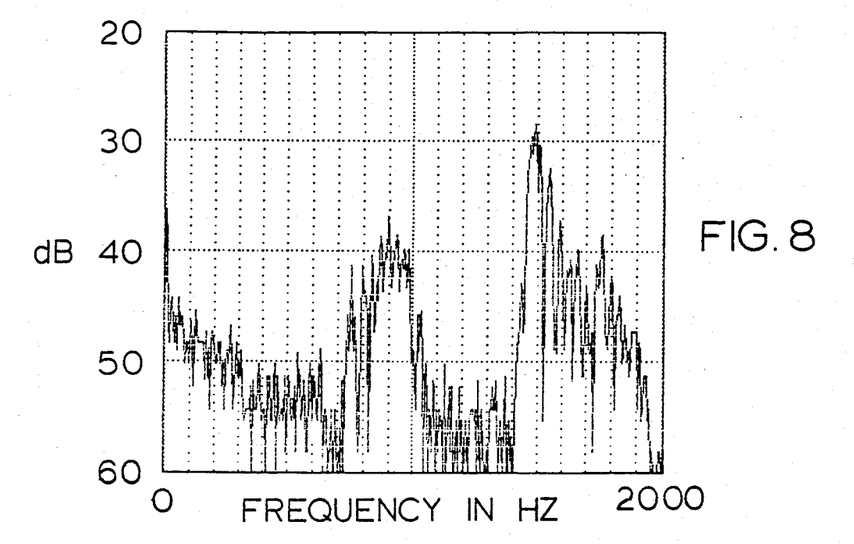
FIG. 8 is a graphic of a sound representation recording of the yelps of a real wild hen turkey calling for a mate.
Figure 9:
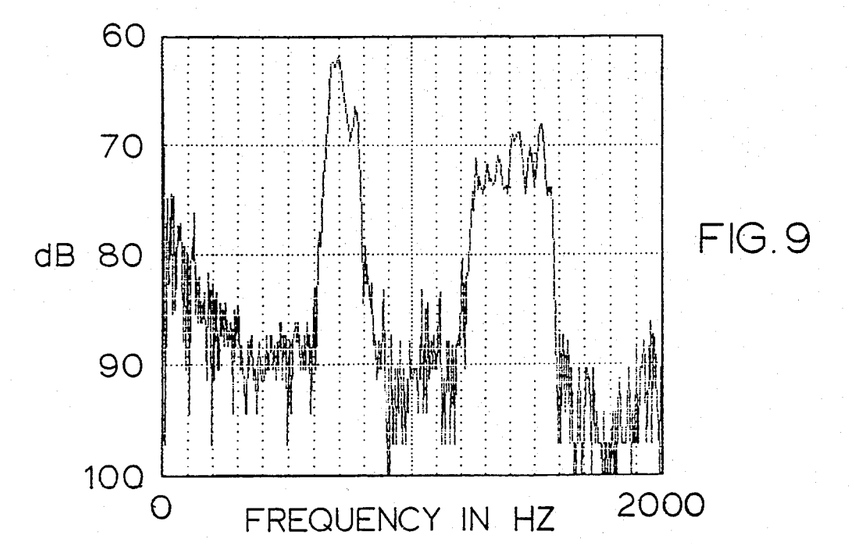
FIG. 9 is a graphic of a sound recording representation of a call generated with the use of the invention according to FIGS. 1-4.
Figure 10:
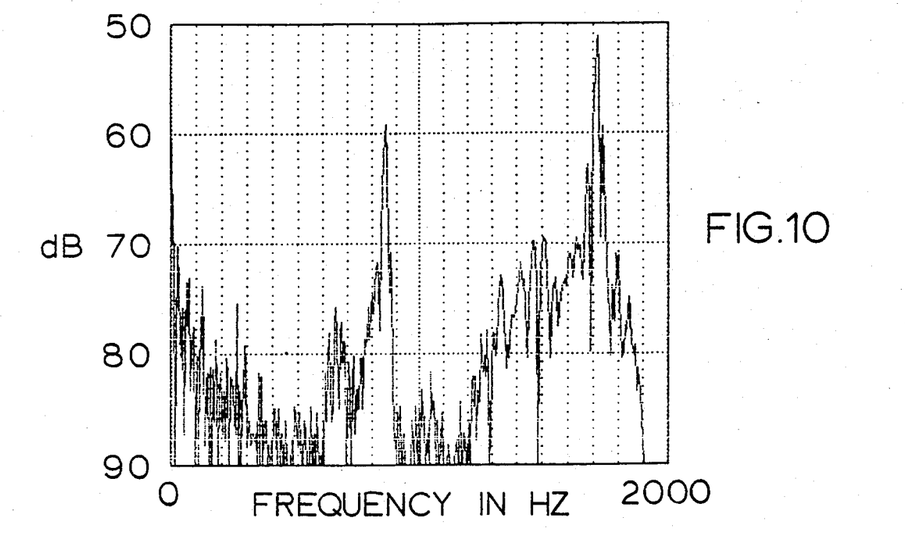
FIG. 10, 11 and 12 are graphic of sound representations recordings of calls generated with use of alternate embodiments as shown in cross-section in FIGS. 5, 6, and 7, respectively.
Figure 11:
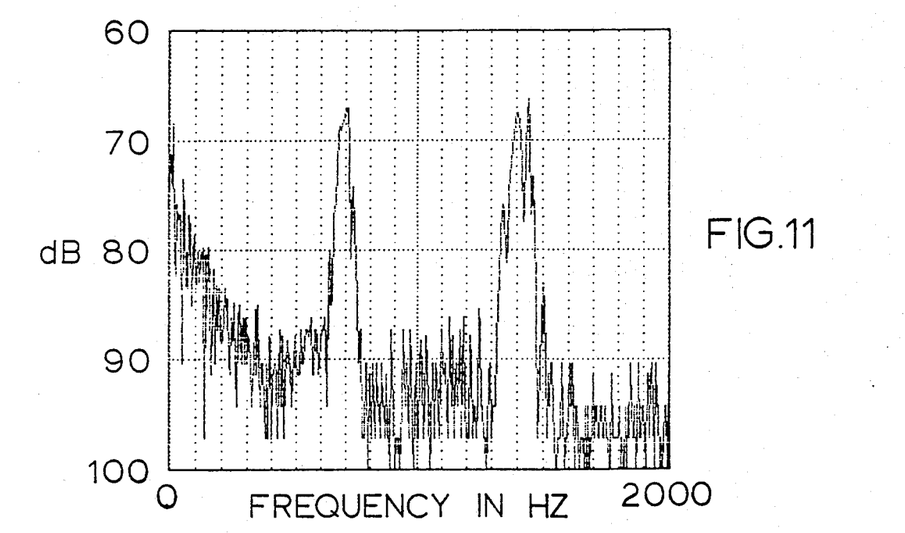
Figure 12:
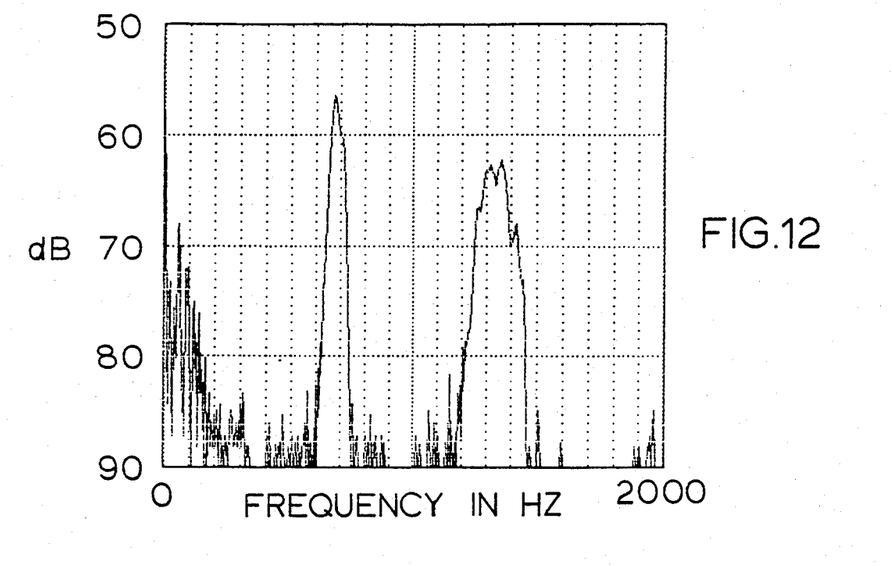
Figure 13:
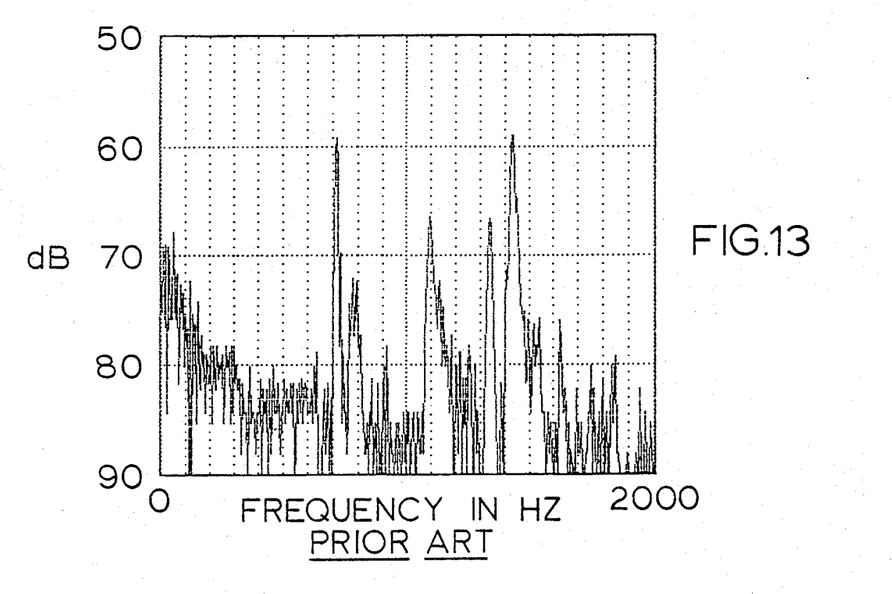
FIG. 13 is a graphic representation of a sound recording of a call generated with the use of the turkey caller disclosed by Moss in U.S. Pat. No. 4,422,262.
Figure 14:
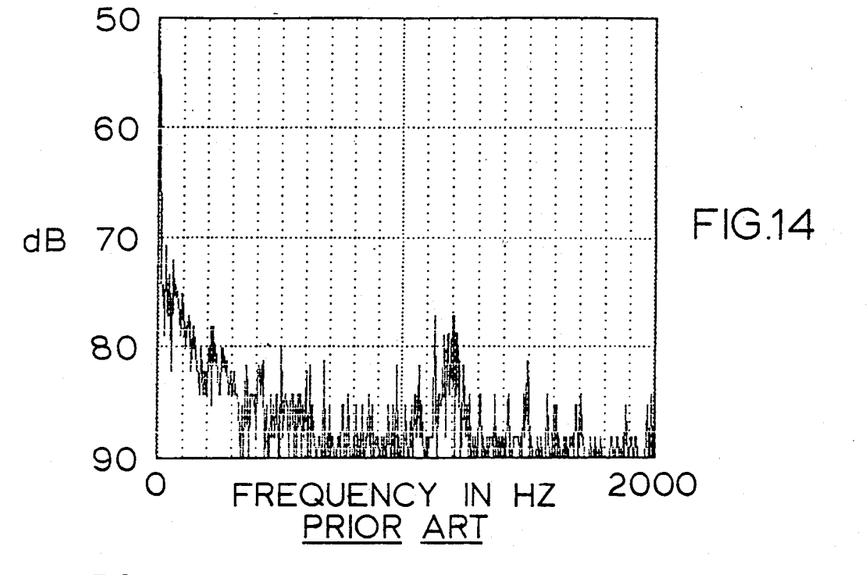
FIG. 14 and 15 are graphic representations of sound recordings of calls generated with use of turkey callers made by M. L. Lynch Co., Inc., Liberty, Miss. 39645, and by The Gobbler Shop, Greenwood, S.C. 29648, respectively, in accordance with Gibson's disclosure (U.S. Pat. No. 574,534).
Figure 15:
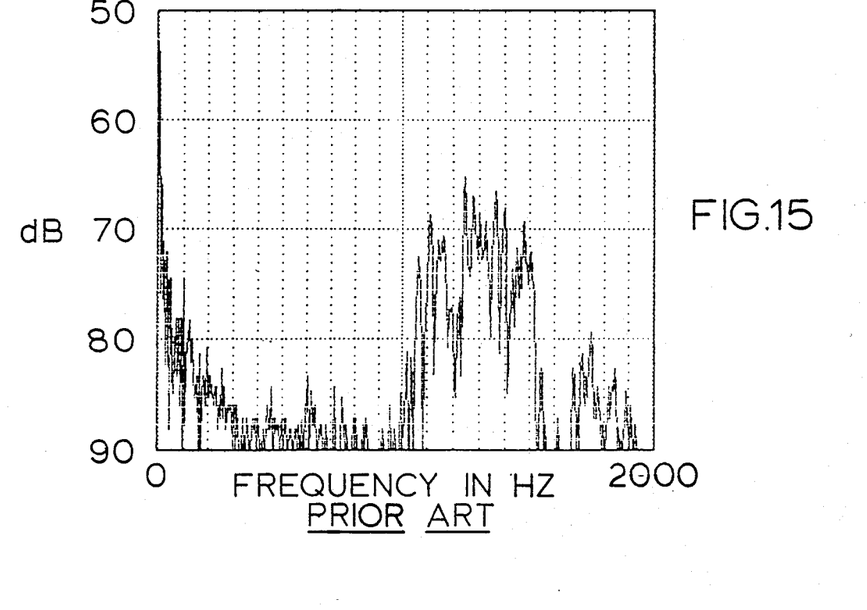

Since the yelps of a hen calling for a mate seem to be the most efficient call to attract male turkeys and to lure them toward the sound, a tape recording of the yelps of a wild hen turkey was placed into the Techron system; and the results are given in FIG. 8. On studying this figure, it is evident that the yelps produced a spectral output which is generally divided into a 700-1000 Hz portion and a 1400-1800 Hz portion.

Test were then conducted on the embodiments shown in FIGS. 4-7; and the results of these tests are presented in FIGS. 9-12, respectively. The test results show that the embodiment shown in FIGS. 1-4 produces a spectral output which, like the hen yelps, is also generally divided into a 600-850 Hz portion and a 1200-1600 Hz portion and which has a tonal quality in these regions that mimics the yelps of a turkey. The test results for the alternate embodiments shown in FIGS. 5-7 in which there is a succession of less rigid connections between the walls of the upper chamber and the lower chamber are presented in FIGS. 10-12, respectively, FIGS. 10-12 indicate that as the connections between the upper chamber and lower chamber are diminished, the richness of the tonal quality needed to mimic the hen yelps is likewise reduced, adding further proof that the closed chamber of the present invention is required to simulate an actual turkey call.

Devices resembling Gibson's caller (U.S. Pat. No. 574,534) manufactured both by M. L. Lynch Co., Inc., Liberty, Miss. 39645, and by The Gobbler Shop, Greenwood, S.C. 29648, were also tested. The results of these tests are given in FIGS. 14 and 15, respectively. It should be noted that these turkey callers simulated at best only the higher frequency portion of the hen turkey's yelps and not the lower.

As noted in the BACKGROUND, there have been attempts to duplicate more closely the sounds of the turkey by dividing the open chamber longitudinally into two laterally opposed sound chambers by a common sidewall or sound board as in the device invented and currently marketed by Moss (U.S. Pat. No. 4,422,262). A test made on Moss's device (FIG. 13) reveals that not only does it produce both the higher and lower frequency portions of a turkey call it also produces uncharacteristic mid-frequency sounds of comparable amplitude. Moreover, the sounds that Moss's caller produces are very sharp and lack the richness in tone of an actual wild turkey's call.

A comparison of tests results FIGS. 8-15 reveals that the caller 10 possesses a capacity to imitate much more closely the wild turkey hen yelps than do either Gibson's or Moss's devices, further underscoring the advantages of including a closed sound chamber box of the present invention.

Having described the invention, what is claimed is:

1. An apparatus for calling certain game birds comprising:
   a generally rectangular, elongated upwardly open chamber assembly and an elongated, generally closed chamber assembly with first and second cavities, respectfully;
   the open chamber assembly including at least two laterally spaced, generally vertical elongated sidewalls which are each made of a material which forms a sound board when stroked; end pieces positioned between the sidewalls at opposite ends of the open chamber assembly which are fixedly mounted to the sidewalls; and a bottom wall to which all lower edges of the sidewalls and of the end pieces are fixedly mounted;
   the bottom wall extending laterally from the lower edges of the sidewalls to form a cover for the closed chamber assembly, a portion of the bottom wall which extends laterally from one of the sidewalls having at least one sound-escape hole; the bottom wall in a region thereof which bounds the open chamber assembly lacking any passageway through which a first air column in the first cavity can fluidly communicate with a second air column in the second cavity; and
   an actuator top that is loosely and pivotally attached to one of the end pieces, a section of the actuator top having a convex undersurface which is adapted to engage the top edge of one of said sidewalls, so that when the undersurface is drawn across said top edge, the sidewall having said top edge is forced to vibrate, setting both the first and second air columns in motion, thereby creating a sound that may attract game birds.

2. In an apparatus for calling game birds having an actuator top with a convex undersurface and at least two laterally spaced, generally vertical, elongated wooden sidewalls bounding an upwardly open, generally rectangular first sound chamber in which sound is made by scraping the undersurface of said actuator top across an upper side of one of said sidewalls, wherein the improvement comprises:
   (a) a bottom wall bounding the first sound chamber, the bottom wall being disposed generally perpendicularly to the sidewalls and being fixedly attached thereto, the bottom wall being capable of vibrating sympathetically with said sidewalls; and
   (b) a second sound chamber for which said bottom wall forms a cover, the second sound chamber being generally closed, so that any vibration received by said bottom wall sets an air column within the second sound chamber in motion, thereby producing resonance which enhances the tonal quality of sound made by scraping the actuator top across the upper edge of one of the sidewalls; the bottom wall in a region thereof which bounds the first sound chamber lacking any passageway through which said air column can fluidly communicate with the first sound chamber.

3. In an apparatus for calling game birds according to claim 2, wherein the second sound chamber is generally rectangular in shape and is substantially greater in width in a transverse direction than is the first sound chamber and wherein portions of said bottom wall are further characterized as extending laterally from the the sidewalls, each vertical cross-section of said portions of the bottom wall being less than one-half as thick as is any vertical cross-section of the bottom wall in the region thereof which bounds the first sound chamber, so that any vibration of the sidewalls induces sympathetic vibrations of significant amplitude within said portions.

4. In an apparatus for calling game birds according to claim 2, wherein the second sound chamber is further described as having at least one sound-escape hole.

* * * * *